United States Patent
Ronchiato (10) Patent No.: US 11,592,098 B2
(45) Date of Patent: Feb. 28, 2023

(54) NON-AXISYMMETIRIC GEAR

(71) Applicant: GE Avio S.r.l., Rivalta di Torino (IT)

(72) Inventor: Luca Ronchiato, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 325 days.

(21) Appl. No.: 16/278,849

(22) Filed: Feb. 19, 2019

(65) Prior Publication Data

US 2019/0271383 A1    Sep. 5, 2019

(30) Foreign Application Priority Data

Mar. 2, 2018 (IT) .................. 102018000003230

(51) Int. Cl.
| | | |
|---|---|---|
| *F16H 1/28* | (2006.01) | |
| *F16H 55/17* | (2006.01) | |
| *F16H 57/00* | (2012.01) | |
| *F16H 55/14* | (2006.01) | |

(52) U.S. Cl.
CPC ............... *F16H 55/14* (2013.01); *F16H 1/28* (2013.01); *F16H 55/17* (2013.01); *F16H 57/0006* (2013.01); *F16H 2001/2881* (2013.01)

(58) Field of Classification Search
CPC . F16H 55/14; F16H 55/17; F16H 1/28; F16H 1/2809; F16H 3/44; F16H 37/022; F16H 48/06; F16H 57/08
USPC .................................................. 475/17, 344
See application file for complete search history.

(56) References Cited

U.S. PATENT DOCUMENTS

| | | | |
|---|---|---|---|
| 3,929,028 A | | 12/1975 | Kirkegaard |
| 4,006,993 A | * | 2/1977 | Woerlee ..................... F16D 1/06 403/359.5 |
| 4,098,096 A | | 7/1978 | Chard et al. |
| 5,419,217 A | * | 5/1995 | Umezawa ............ B21D 53/845 74/567 |
| 5,820,504 A | | 10/1998 | Geralde |
| 5,852,951 A | | 12/1998 | Santi |
| 8,251,620 B2 | | 8/2012 | Doubler et al. |
| 8,727,936 B2 | * | 5/2014 | Asakura ................ B60R 16/027 475/347 |
| 2012/0325037 A1 | | 12/2012 | Teramoto et al. |
| 2015/0047448 A1 | | 2/2015 | Ning et al. |
| 2016/0290489 A1 | | 10/2016 | Lemmers, Jr. et al. |
| 2017/0059030 A1 | | 3/2017 | McKinzie |

FOREIGN PATENT DOCUMENTS

| | | |
|---|---|---|
| DE | 10117900 | 10/2002 |
| DE | 102014214743 | 1/2016 |
| GB | 979541 | 1/1965 |

(Continued)

OTHER PUBLICATIONS

Italian Search Report and Written Opinion dated Oct. 17, 2018 which was issued in connection with IT102018000003230 which was filed on Mar. 2, 2018.

*Primary Examiner* — Bobby Rushing, Jr.

(74) *Attorney, Agent, or Firm* — Dority & Manning, P.A.

(57) ABSTRACT

A gear assembly including a first gear including a rim and a plurality of teeth. The plurality of teeth is configured to contact one or more of another plurality of teeth. A non-axisymmetric structure is defined at the rim. The non-axisymmetric structure is a non-contacting structure of the gear assembly.

11 Claims, 5 Drawing Sheets

(56) References Cited

FOREIGN PATENT DOCUMENTS

| | | | | |
|---|---|---|---|---|
| JP | 05215191 | A | * | 8/1993 |
| JP | 2009133380 | A | * | 6/2009 |
| WO | 2005106286 | | | 11/2005 |
| WO | 2013/017191 | | | 2/2013 |

* cited by examiner

NON-AXISYMMETIRIC GEAR

FIELD

The present subject matter relates generally to gears and gear assemblies.

BACKGROUND

Mechanical and electro-mechanical systems, such as turbine engines including industrial and aviation gas turbines and wind turbines, include gear assemblies to change an input or output rotational speed between two or more shafts such as to optimize turbine engine efficiency and performance. However, non-constant transmission of motion between mating gears is known to be a significant source of undesired excitation gear assembly vibrations. Such vibrations may deteriorate overall system performance, such as via limiting operational speeds or requiring additional dampers to attenuate excitation which may increase system weight, thereby otherwise decreasing system performance and efficiency.

While it is known to optimize engaging gear tooth geometry to minimize excitation effects, this approach is limited due to bending stresses at the teeth, desired contact patterns that influence efficiency and noise, and overall constraints on gear size and geometry. As such, there is a need for a gear and gear assembly that reduces undesired excitations that may reduce gear assembly and turbine engine performance.

BRIEF DESCRIPTION

Aspects and advantages of the invention will be set forth in part in the following description, or may be obvious from the description, or may be learned through practice of the invention.

The present disclosure is directed to a gear assembly including a first gear including a rim and a plurality of teeth. The plurality of teeth is configured to contact one or more of another plurality of teeth. A non-axisymmetric structure is defined at the rim. The non-axisymmetric structure is a non-contacting structure of the gear assembly.

In various embodiments, the non-axisymmetric structure defines a cyclic symmetric structure at the rim. In one embodiment, the cyclic symmetric structure defines a periodicity equal to the plurality of teeth.

In one embodiment, the non-axisymmetric structure is defined at a diameter of the rim different from the plurality of teeth.

In various embodiments, the non-axisymmetric structure is defined at a longitudinal face at a surface at the rim adjacent to the plurality of teeth. In one embodiment, the non-axisymmetric structure protrudes along a non-radial direction into or out of the rim.

In still various embodiments, a surface at the rim radially opposite of the plurality of teeth defines the non-axisymmetric structure. In one embodiment, the surface at the rim is non-circular relative to a centerline axis of the first gear.

In still yet various embodiments, the non-axisymmetric structure defines a first face extended relative to a radial reference line from a centerline axis at an oblique first angle. In one embodiment, the non-axisymmetric structure defines a second face extended relative to the radial reference line at an oblique second angle different from the first angle.

Another aspect of the present disclosure is directed to a mechanical or electro-mechanical system including the gear assembly.

In one embodiment, the system further includes a low speed rotor assembly and a power shaft. The gear assembly is defined in serial energy arrangement between the low rotor assembly and the power shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a gear and gear assembly that reduces undesired excitations that may reduce gear assembly and system performance are generally provided. Various embodiments of the gear and gear assembly shown and described herein may modify modal behavior of the gear and gear assembly via a non-axisymmetric structure defined at a rim of the gear. Embodiments herein providing a mistuned structure to modify the modal behavior of the gear assembly and system generally define the non-axisymmetric structure in an area that may otherwise contribute to the undesired resonant modes.

Various embodiments of the gear and gear assembly shown and described herein may minimize frequency modulation, or sidebands, resulting from varying stiffness between the plurality of teeth from two or more meshed gears. Still various embodiments of the gear and gear assembly defining the non-axisymmetric structure may provide substantially constant stiffness at the gear such as to reduce or substantially eliminate variations in stiffness resulting from engagement and disengagement of the plurality of teeth from two or more meshed gears during operation.

As such, embodiments of the gear and gear assembly generally shown and described herein may desirably modify modal behavior of the gear and gear assembly, and the system to which they are coupled. The embodiments shown and described herein may additionally, or alternatively, provide a substantially constant stiffness at the gear, thereby mitigating or eliminating fluctuations in mesh stiffness. Embodiments generally shown and described herein may further improve system performance, efficiency, or operability via efficiencies derived from removing or decreasing application of additional dampers, damper coatings (e.g., molybdenum coating), or other attachments and couplings.

Figure 1:
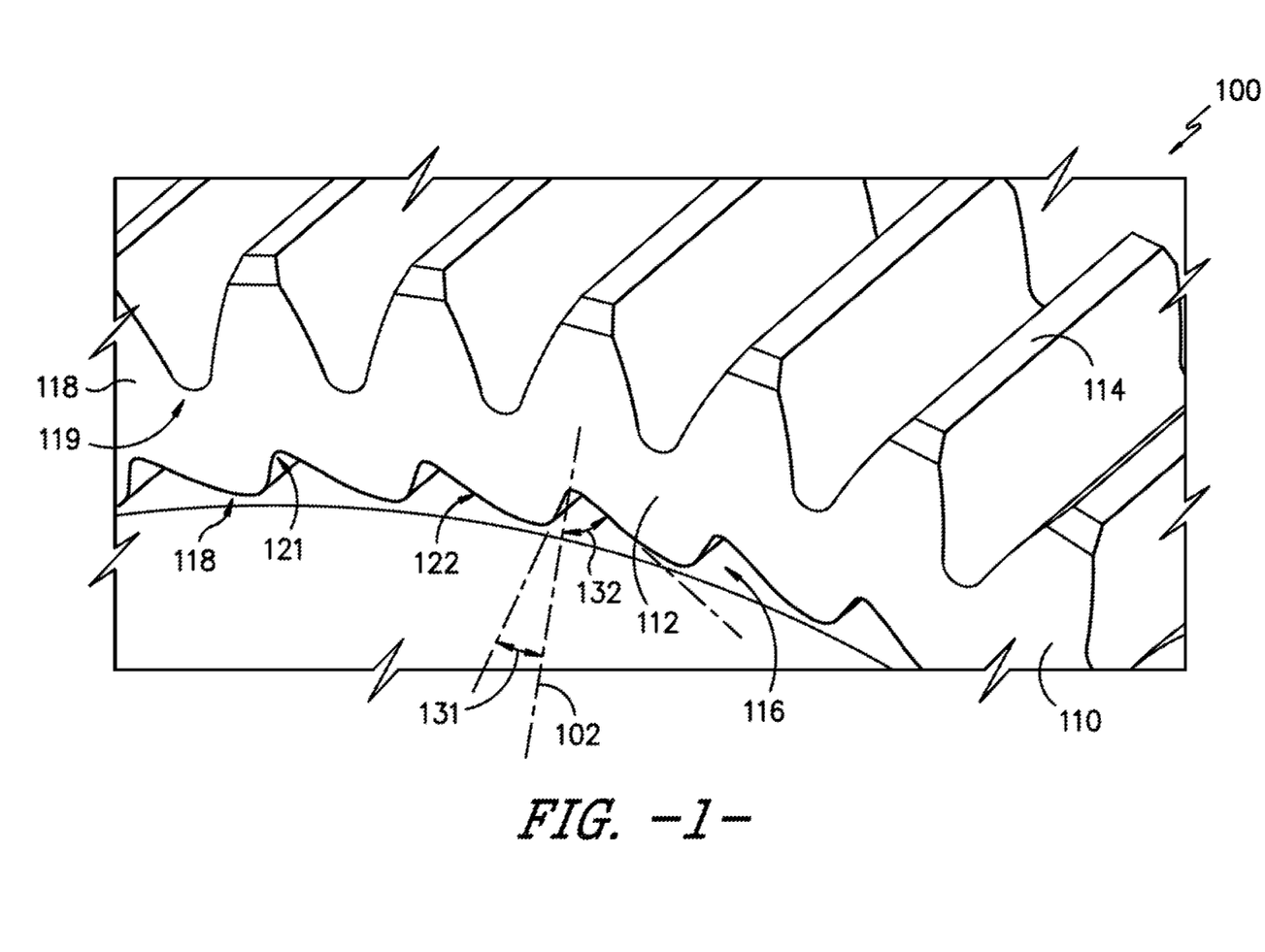
FIGS. 1-3 are exemplary embodiments of a first gear of a gear assembly.

Referring now to FIG. 1, a perspective view of an exemplary embodiment of a first gear 110 of a gear assembly 100 according to an aspect of the present disclosure is generally provided. The first gear 110 of the gear assembly 100 includes a rim 112 and a plurality of teeth 114. The plurality of teeth 114 is configured to contact one or more of another plurality of teeth of another gear of the gear assembly 100. A non-axisymmetric structure 116 is defined at the rim 112. The non-axisymmetric structure 116 is a non-contacting structure of the gear assembly 100. For example, the non-axisymmetric structure 116 is substantially free from contact or interface with another gear or shaft. It should be appreciated that other gear or teeth configurations may be applicable to the present disclosure such as to mitigate or cancel sources of vibration, minimize resonance amplitudes, or otherwise modify modal behavior of the first gear 110 and gear assembly 100.

Figure 4:
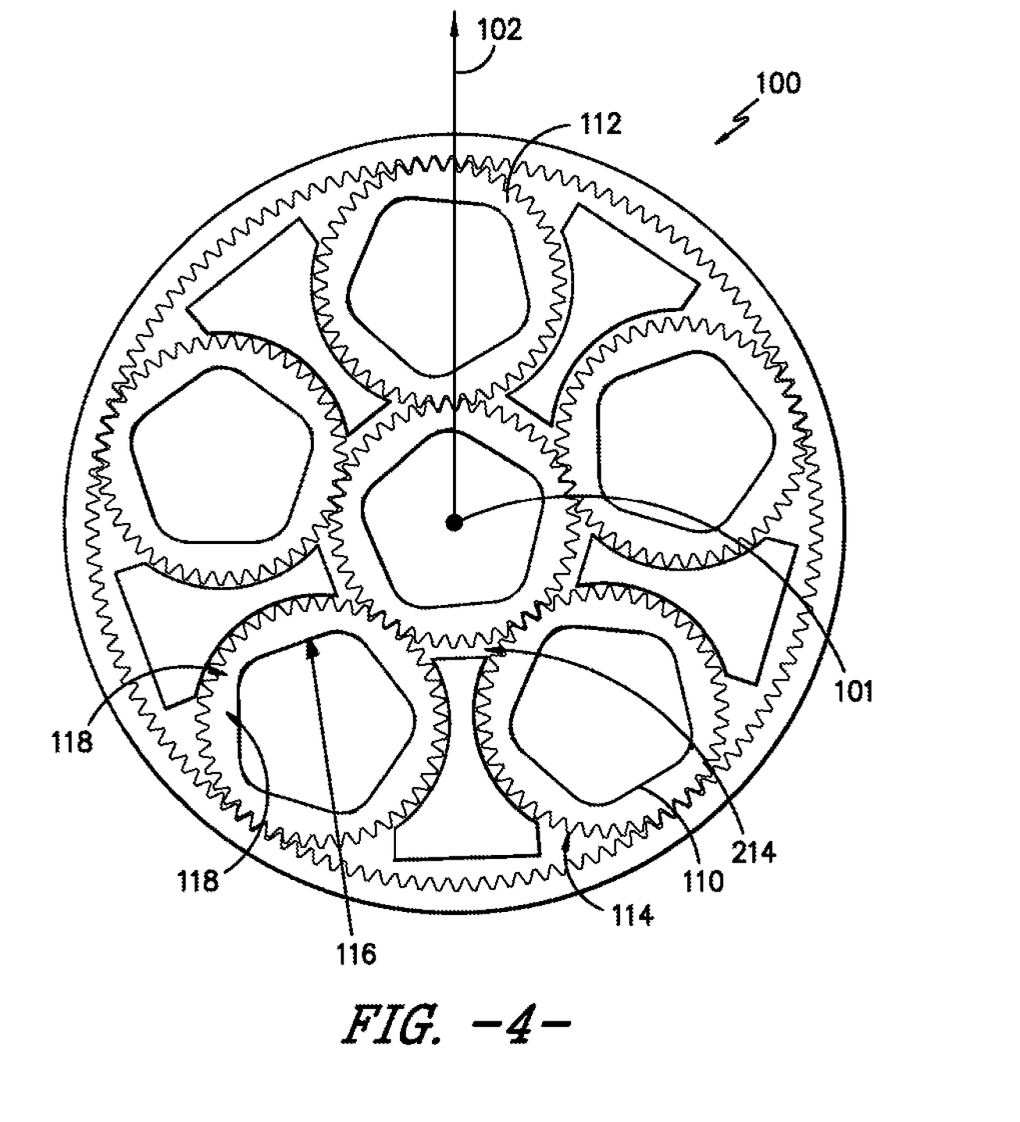
FIG. 4 is an exemplary embodiment of a gear assembly including the first gear.

The non-axisymmetric structure 116 is defined at a diameter or surface 118 of the rim 112 different from the plurality of teeth 114. Referring still to FIG. 1, in conjunction with an exemplary schematic gear assembly 100 generally depicted in FIG. 4, a reference centerline axis 101 is defined through a center point of the first gear 110. A radial reference line 102 is extended from the centerline axis 101 along a radial direction. In one embodiment, such as generally provided in FIG. 1, the surface 118 at the rim 112 at which the non-axisymmetric structure 116 is defined is opposite of the plurality of teeth 114 along the radial direction. For example, as generally provided in FIG. 1, the plurality of teeth 114 are defined outward along the radial direction away from the centerline axis 101 such as to mesh with one or more second pluralities of teeth 214 (see for example, FIG. 4) radially outward of the plurality of teeth 114 of the first gear 110 (i.e., an external gear configuration).

In other embodiments (not illustrated in the figures), the surface 118 at the rim 112 at which the non-axisymmetric structure 116 is defined is radially outward along the rim 112 relative to the plurality of teeth 114. For example, the plurality of teeth 114 are defined radially inward, such as toward the centerline axis 101 (i.e., an internal gear configuration).

Figure 2:
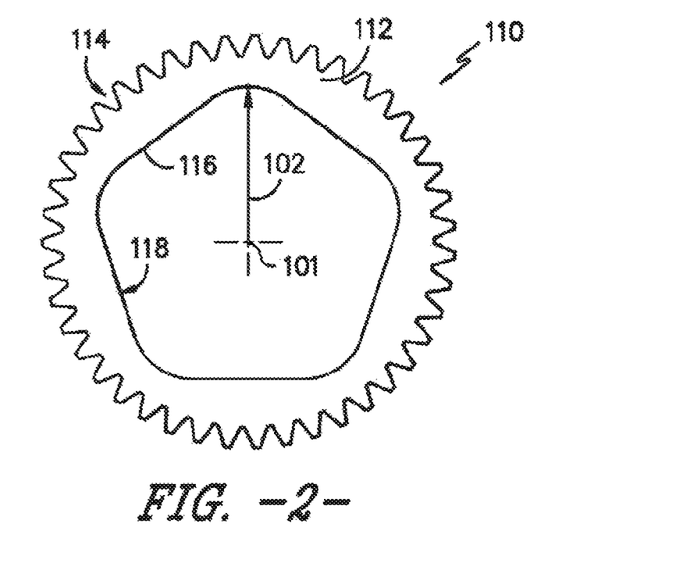

In still another embodiment, such as generally provided in FIG. 2, the surface 118 at the rim 112 at which the non-axisymmetric structure 116 is defined non-circular relative to the centerline axis 101 of the first gear 110. For example, the non-axisymmetric structure 116 may define a variable radius along the surface 118 relative to the centerline axis 101. In one embodiment, the variable radius along the surface 118 defining the non-axisymmetric structure 116 is substantially evenly or regularly distributed about the centerline axis 101. In another embodiment, such as depicted in regard to FIG. 3, the variable radius along the surface 118 defining the non-axisymmetric structure 116 is substantially irregular about the centerline axis 101. However, in such an embodiment, the irregular distribution of radii along the surface 118 is distributed such as to maintain rotational or mass balance of the first gear 110.

Referring back to FIG. 1, in still yet another embodiment (but not shown in the drawings), the surface 118 at the rim 112 at which the non-axisymmetric structure 116 is defined may be at a longitudinal face 119 adjacent to the plurality of teeth 114. For example, the non-axisymmetric structure 116 may protrude longitudinally or along a non-radial direction into or out of the rim 112.

The non-axisymmetric structure 116 of the rim 112 enables a substantially constant stiffness of the first gear 110. For example, during operation of the gear assembly 100, stiffness at the plurality of teeth 114 varies periodically with each cycle of contact with each tooth of a second plurality of teeth 214 meshed with the first gear 110. The non-axisymmetric structure 116 defined at the rim 112 contributes to the total stiffness of the mesh of the plurality of teeth 114 and the second plurality of teeth 214 such as exemplified by the equation:

$$K_{total} = \frac{1}{\left(\frac{1}{K_{rim}}\right) + \left(\frac{1}{K_{teeth}}\right)}$$

where $K_{total}$ is the total stiffness of first gear 110 with the plurality of teeth 114 meshed with the second plurality of teeth 214; $K_{rim}$ is the stiffness of the rim 112 of the first gear 110 defining the non-axisymmetric structure 116; and $K_{teeth}$ is the stiffness of the plurality of teeth 114 of the first gear 110. As such, the non-axisymmetric structure 116 at the rim 112 enables a substantially constant total stiffness by compensating for any variation due to changes in angular position of the meshed plurality of teeth 114.

In various embodiments, the non-axisymmetric structure 116 defines a cyclic symmetric structure at the rim 112. For example, the non-axisymmetric structure 116 at the rim 112 defining the cyclic symmetric structure defines a periodicity equal to the plurality of teeth 114. As another example, the cyclic symmetric structure may be defined by a plurality of non-axisymmetric structure 116 extended from the rim 112 (e.g., a first face 121 and a second face 122 such as shown and described in regard to FIG. 1 and discussed below). The cyclic symmetric structure represented by this plurality of non-axisymmetric structure 116 has a periodicity equal to the quantity of the plurality of teeth 114.

Referring back to FIG. 1, in still various embodiments, the non-axisymmetric structure 116 may define a first face 121 extended relative to the radial reference line 102 at an oblique first angle 131. For example, the oblique first angle 131 is greater than 0 degrees and less than 90 degrees relative to the radial reference line 102. In various embodiments, the first angle 131 is between 0 degrees and approximately 60 degrees relative to the radial reference line 102. In still various embodiments, the first angle 131 is between 0 degrees and approximately 45 degrees relative to the radial reference line 102.

In another embodiment, the non-axisymmetric structure 116 may define a second face 122 extended relative to the radial reference line 102 at an oblique second angle 132 different from the first angle 131. For example, the second face 122 is a portion of the non-axisymmetric structure 116, the second face 122 and the second angle 132 being generally different from the first face 121 defining the first angle 131. In various embodiments, the second angle 132 is greater than 0 degrees and less than 90 degrees relative to the radial reference line 102.

Figure 3:
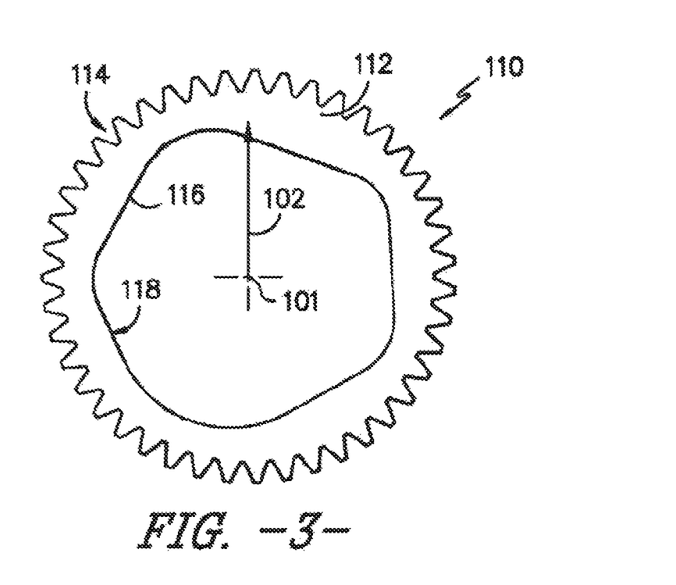
Figure 5:
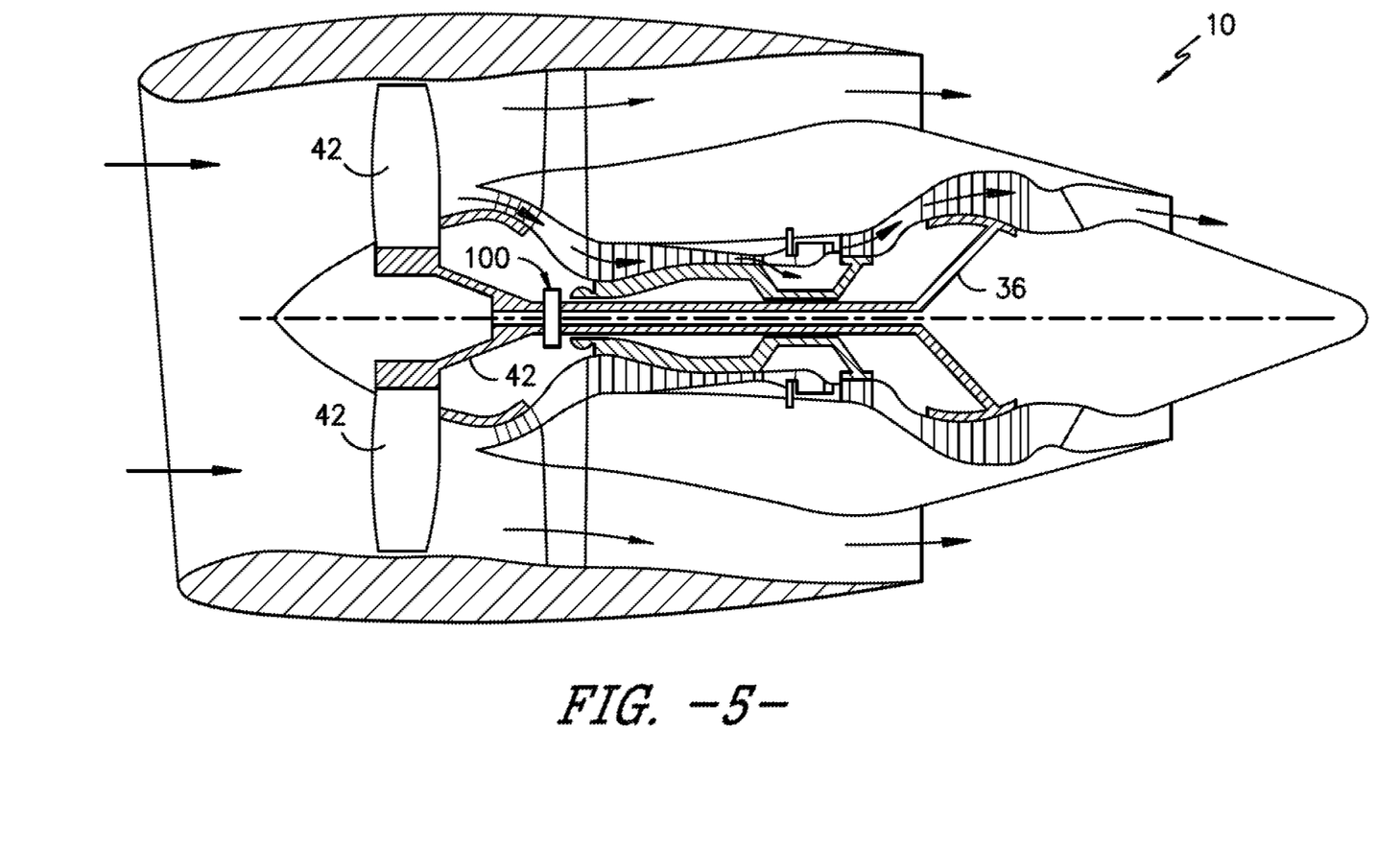
FIGS. 5-6 are exemplary embodiments of systems incorporating exemplary embodiments of the gear assembly of FIGS. 1-3.
Figure 6:
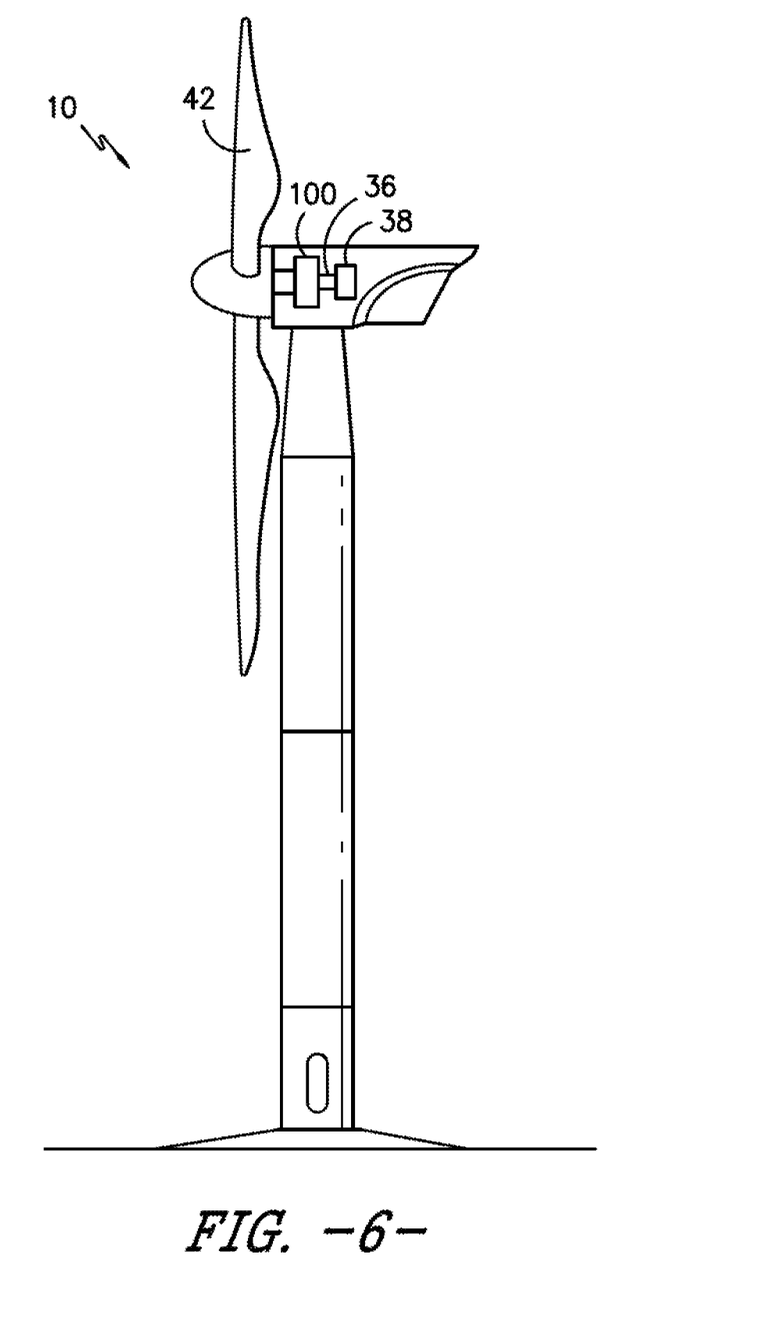

Referring now to FIGS. 5-6, exemplary embodiments of systems 10 into which one or more exemplary embodiments of the gear assembly 100 shown and described in regard to FIGS. 1-3 are generally provided. The systems 10 depicted generally include turbine engines, such as, but not limited to, gas turbine engines (FIG. 5) and wind turbines (FIG. 6). The gear assembly 100 including the first gear 110 enables a speed change between a low speed rotor assembly 42 and a power shaft 36. For example, regarding FIG. 5, the system 10 defining a gas turbine engine may define a turboprop, turboshaft, or turbofan engine configuration including the gear assembly 100. The gear assembly 100 may be disposed in serial energy flow arrangement between the shaft 36 (e.g., a low pressure or low speed shaft) and the low speed rotor assembly 42 (e.g., fan or propeller assembly) such as to reduce an output speed from the shaft 36 to the low speed rotor assembly 42. As another example, regarding FIG. 6, the system 10 defining a wind turbine including the gear assembly 100 may be disposed in serial energy flow arrangement between a low speed rotor assembly 42 (e.g., wind turbine blades) and a power shaft 36 (e.g., power shaft 36 coupled to generator 38) such as to increase an output speed from the low speed rotor assembly 42 to the power shaft 36 coupled to generator 38.

The systems 10 into which the gear assembly 100 and the first gear 110 are coupled are provided by way of example. As such, it should be appreciated that the exemplary embodiments of the first gear 110 and the gear assembly 100 shown and described in regard to FIGS. 1-4 may be applied to other mechanical or electro-mechanical systems not shown herein.

Embodiments of the gear assembly 100 and the first gear 110 generally shown and described herein may be produced using one or more manufacturing methods known in the art. For example, the first gear 110 may be manufactured via one or more processes known as additive manufacturing or 3D printing, machining processes, forgings, castings, etc., or combinations thereof. Still further, the non-axisymmetric structure 116 may be formed into the rim 112, such as via one or more of the processes described herein, or via welding, brazing, or otherwise adhering one or more components or sections to the rim 112 to form the non-axisymmetric structure 116. Alternatively, or additionally, the non-axisymmetric structure 116 may be formed into the rim 112 via a material removal process, such as, but not limited to, a machining process (e.g., milling, grinding, boring, etc.).

Further embodiments of the gear assembly 100 may define a planetary gear assembly, a compound planetary gear assembly, an epicyclic gear assembly, or other suitable gear assembly for a mechanical or electro-mechanical system. As such, the first gear 110 may include a plurality of the first gear 110 defining one or more root diameters, outside diameters, pitches, flanks, lands, faces, tooth configurations generally, or rotary/stationary arrangements. Various embodiments of the gear assembly 100 may define the first gear 110, or one or more other gears, as a spur or straight-cut gear, bevel gear, crown gear, hypoid gear, spiral gear, helical gear, miter gear, screw gear, or worm gear, or other appropriate gear configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gear assembly, the gear assembly comprising:
   a first gear comprising:
   a rim, and
   a plurality of teeth,
   wherein the plurality of teeth is configured to contact one or more of another plurality of teeth,
   wherein a non-axisymmetric structure is defined at the rim,
   wherein the non-axisymmetric structure is a non-contacting structure of the gear assembly,
   wherein the non-axisymmetric structure defines a cyclic symmetric structure at the rim, and
   wherein the cyclic symmetric structure defines a periodicity equal to the plurality of teeth.

2. The gear assembly of claim 1, wherein the non-axisymmetric structure is defined at a diameter of the rim different from the plurality of teeth.

3. The gear assembly of claim 1, wherein a surface at the rim radially opposite of the plurality of teeth defines the non-axisymmetric structure.

4. The gear assembly of claim 1, wherein the non-axisymmetric structure defines a first face extended relative to a radial reference line from a centerline axis at an oblique first angle.

5. The gear assembly of claim 4, wherein the non-axisymmetric structure defines a second face extended relative to the radial reference line at an oblique second angle different from the first angle.

6. A mechanical or electro-mechanical system, the system comprising:
   a gear assembly comprising:
   a first gear comprising:
   a rim, and
   a plurality of teeth,
   wherein the plurality of teeth is configured to contact one or more of another plurality of teeth,
   wherein a non-axisymmetric structure is defined at the rim,
   wherein the non-axisymmetric structure is a non-contacting structure of the gear assembly,
   wherein the non-axisymmetric structure of the gear assembly defines a cyclic symmetric structure at the rim, and wherein the cyclic symmetric structure defines a periodicity equal to the plurality of teeth.

7. The system of claim 6, wherein the non-axisymmetric structure is defined at a diameter of the rim different from the plurality of teeth.

8. The system of claim 6, wherein a surface at the rim radially opposite of the plurality of teeth defines the non-axisymmetric structure.

9. The system of claim 6, wherein the non-axisymmetric structure defines a first face extended relative to a radial reference line from a centerline axis at an oblique first angle.

10. The system of claim 9, wherein the non-axisymmetric structure defines a second face extended relative to the radial reference line at an oblique second angle different from the first angle.

11. The system of claim 6, further comprising:
a low speed rotor assembly; and
a power shaft, wherein the gear assembly is defined in serial energy arrangement between the low rotor assembly and the power shaft.

* * * * *